(No Model.) 2 Sheets—Sheet 1.
M. J. WARD.
LUGGAGE CARRIER FOR BICYCLES.
No. 599,750. Patented Mar. 1, 1898.
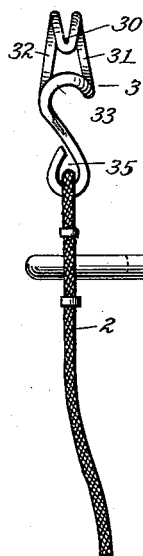
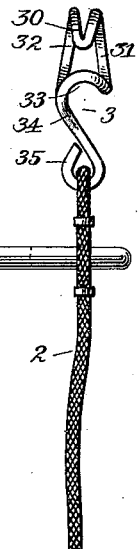
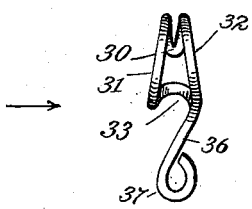
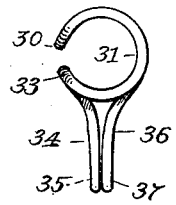
WITNESSES:
Edward B. Rowland
Arthur F. Thompson
INVENTOR
Margy J. Ward,
BY
D. A. Carpenter,
ATTORNEY (No Model.)  2 Sheets—Sheet 2.
M. J. WARD.
LUGGAGE CARRIER FOR BICYCLES.
No. 599,750. Patented Mar. 1, 1898.
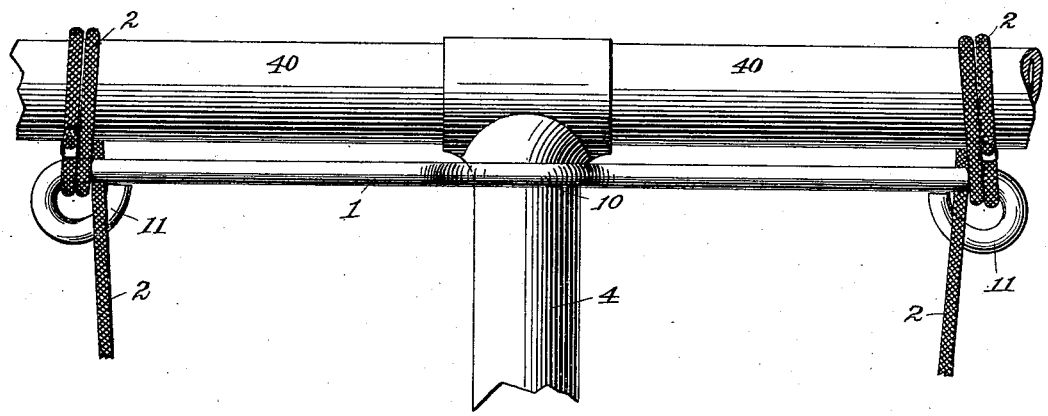
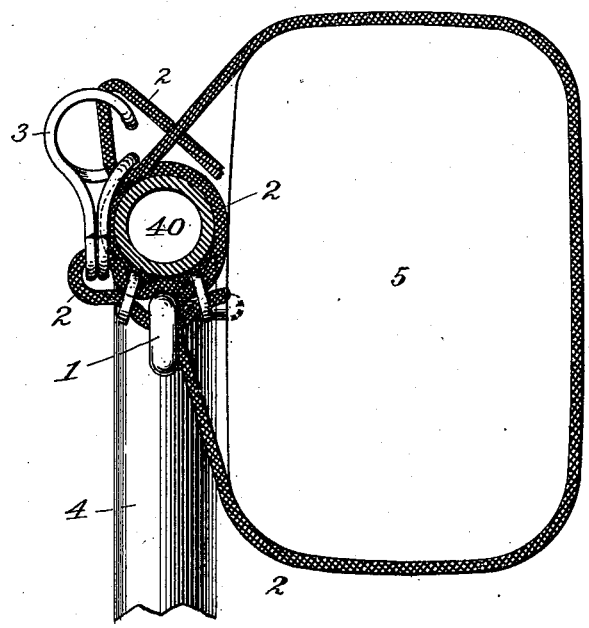
WITNESSES:
Edward B. Rowland.
Arthur F. Thompson.
INVENTOR
Mary J. Ward.
BY
D. A. Carpenter,
ATTORNEY
THE NORRIS PETERS CO., PHOTO-LITHO., WASHINGTON, D. C.

UNITED STATES PATENT OFFICE.

MARZY J. WARD, OF UNADILLA, NEW YORK.

LUGGAGE-CARRIER FOR BICYCLES.

SPECIFICATION forming part of Letters Patent No. 599,750, dated March 1, 1898.

Application filed November 20, 1895. Serial No. 569,538. (No model.)

*To all whom it may concern:*

Be it known that I, MARZY J. WARD, of Unadilla, in the county of Otsego and State of New York, have invented a certain new and useful Improvement in Luggage-Carriers for Bicycles, of which the following is a full, clear, and exact description, reference being made to the accompanying drawings, forming part of this specification.

This invention relates to improvements in luggage-carriers which are adapted to be attached to the handle-bars of a bicycle; and the invention consists of a luggage-carrier comprising a stay with leashes secured thereto close to its ends and fastening devices secured to the leashes, the stay and fastening devices having certain peculiarities of form and structure which are hereinafter fully described.

On the accompanying sheets of drawings, Figure 1 is a top view of the luggage-carrier. Figs. 2 and 3 are views of the fastening device in different positions. Fig. 4 is another view of the fastening device and pieces of a leash held by it; Fig. 5, a front view of parts of the handle-bars and handle-bar post of a bicycle and of the carrier attached thereto, and Fig. 6 a view from one side of a bicycle of the carrier and an object held by it.

Similar reference-numerals designate like parts in the different views.

This luggage-carrier is represented in the drawings by full-sized views. The stay 1 is formed from a rod or bar of metal. Top and front views of the stay are shown, respectively, in Figs. 1 and 5. It has at the middle the curved part 10, which extends in front of the rest of the stay and conforms to the handle-bar post of a bicycle, and at the ends the eyes 11, with horizontal passageways. It is coated with tin, nickel, silver, or gilt, according to the finish desired. In each of the eyes 11 of the stay is secured one of the leashes 2. These are either cotton or silk cords, and they are long enough to pass around a large bundle. The fastening devices 3 are secured to the leashes on the back of the stay, the backs of these devices being downward when the leashes and stay are in the positions in which they are shown in Fig. 1. Figs. 1 and 6 show clearly how the leashes are secured to the stay and the fastening devices to the leashes. These fastening devices are both alike and are similar to but an improvement on that patented in Letters Patent No. 428,434, dated May 20, 1890. They are commonly made from wire, and their size and the thickness of the wire depend upon the thickness of the leashes to be held by them. These may be a fibrous, leather, or other string, a cord, a rope, or a tape. The leash or cord being of the size of the cord 2 of the drawings, the fastening device should be of the size and the wire of the thickness shown in Figs. 1, 2, 3, and 4.

In Fig. 1 an edge view of the fastening device is shown. This is the edge which faces any object around which the leash passes and is hereinafter termed the "face edge" or "face." The back or edge opposite the face is shown in Fig. 2. Fig. 3 shows the left side of the device, or the side indicated by the arrow on the left of Fig. 2, and Fig. 4 shows its opposite or right side. The wire is bent at 30, as shown in Figs. 1 and 2, the space between the two branches of the wire tapering like a slender V from that bend. The branches of the wire adjacent to the bend 30 are curved on the arcs of similar circles, the arc 31 being thus formed on the left side and the arc 32 on the right side of the device. From the arc 31 the left branch of the wire extends to the right side of the device and forms the bend 33, and from this bend it extends first backward a short distance beside the arc 31, as shown in Fig. 4, and then away from the arcs 31 and 32 and toward the left side of the device, as shown in Fig. 1, forming the section 34, on which is an eye 35. The right branch of the wire forms next to the arc 32 a section 36, which lies directly behind the section 34, and on the section 36 is an eye 37, close to and face to face with the eye 35. The leash 2 to which the fastening device is secured passes through the eyes 35 and 37, as represented in Fig. 4. To fasten the leash after it has been passed around a bundle, it is carried between the arcs 31 and 32 of the fastening device and into the bend 33. Then it is pulled taut in this bend, in which it slides freely, and finally it is drawn toward the bend 30 until it is pinched between the arcs.

It will be observed from Figs. 1 and 2 that the middle of the bend 30, the middle of the bend 33, and the centers of the eyes 35 and 37 lie in one plane. The device is therefore held naturally by the leash in the best possible position to withstand a severe strain.

The improvement in this device upon that patented in the above-mentioned patent consists in providing the device with the eyes 35 and 37, in the peculiar formation described of the section 34, adjacent to the bend 33, whereby the introduction of the leash between the arcs 31 and 32 and drawing the leash taut are facilitated, and in the arrangement in one plane, as explained, of the center of the eye in which the leash is secured and the middle of the bend 30 and middle of the bend 33.

This luggage-carrier is attached to a bicycle by holding the stay 1 against the handle-bar post 4 and underneath the handle-bars 40, as it appears in Fig. 5, and winding each leash once or twice around the handle-bar and stay, the leash being passed upward in front of the handle-bar and downward behind it and through the eye 11 of the stay. An object 5 that is to be carried is supported by the leashes 2, which are passed around the object, as indicated by Fig. 6, and fastened in the fastening devices 3, and when the leashes are thus fastened the carrier, with its contents, is securely fixed to the handle-bars.

When the carrier is removed from the bicycle, the leashes may be wound upon the stay, and the carrier can then easily be put into a person's pocket.

It is obvious that the leashes may consist of straps instead of cords, buckles being secured to the straps and bearing relations to the straps similar to those which the fastening devices 3 bear to the cords 2, and a luggage-carrier thus constructed is deemed to be within the scope of the invention.

Having thus described my invention, what I claim as new, and desire to secure by Letters Patent, is—

1. A luggage-carrier comprising: a stay 1 adapted to extend on opposite sides of the handle-bar post of a bicycle underneath the handle-bars and having the curved part 10 conforming to the handle-bar post, leashes secured to the stay close to its ends, and fastening devices secured to the leashes behind and near the stay, the face of each fastening device, namely that which naturally faces an object encircled by the leash, being upward, substantially as described.

2. A luggage-carrier comprising: a stay 1 adapted to extend on opposite sides of the handle-bar post of a bicycle underneath the handle-bars and having midway between its ends the curved part 10 and near its ends the eyes 11 forming horizontal passage-ways, leashes 2 secured in the eyes 11, and fastening devices 3 secured to the leashes behind and near the stay, the face of each fastening device being upward, substantially as described.

3. A fastening for a luggage-carrier and bundle, or other objects, comprising a cord or leash 2, and a holding device 3 made from wire and having the arcs 31 and 32 united at 30 and diverging gradually from each other from that point, the bend 33 on the arc 31, the section 34 on the bend 33, the section 36 on the arc 32 and directly behind the section 34, and the eyes 35 and 37 on the sections 34 and 36 respectively and with their inner faces close together, substantially as described.

4. A fastening for a luggage-carrier and bundle, or other objects, comprising a cord or leash 2, and a holding device made from wire and having the arcs 31 and 32 united at 30 and diverging gradually from each other from that point, the bend 33 on the arc 31, and an eye connected with the bend 33 and adapted to hold a leash, the center of the eye and the point 30 and the middle of the bend 33 being in one plane, substantially as described.

MARZY J. WARD.

In presence of—
  WM. W. SHAW,
  AMOS H. DODGE.